Aug. 3, 1948.    C. E. PIERCE    2,446,488
HOISTING DEVICE
Filed May 11, 1945    2 Sheets-Sheet 2
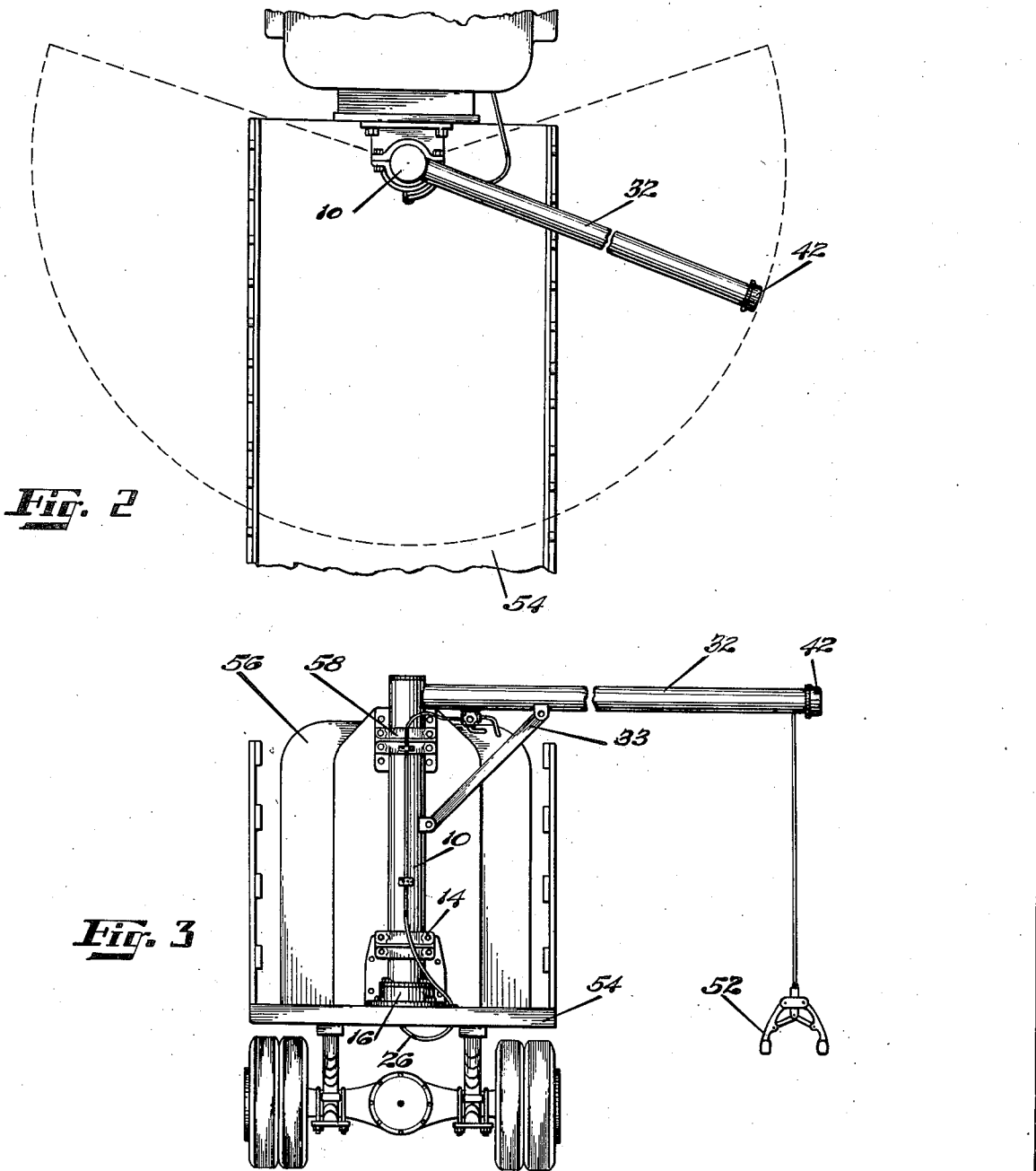
INVENTOR.
BY Cecil E. Pierce Patented Aug. 3, 1948

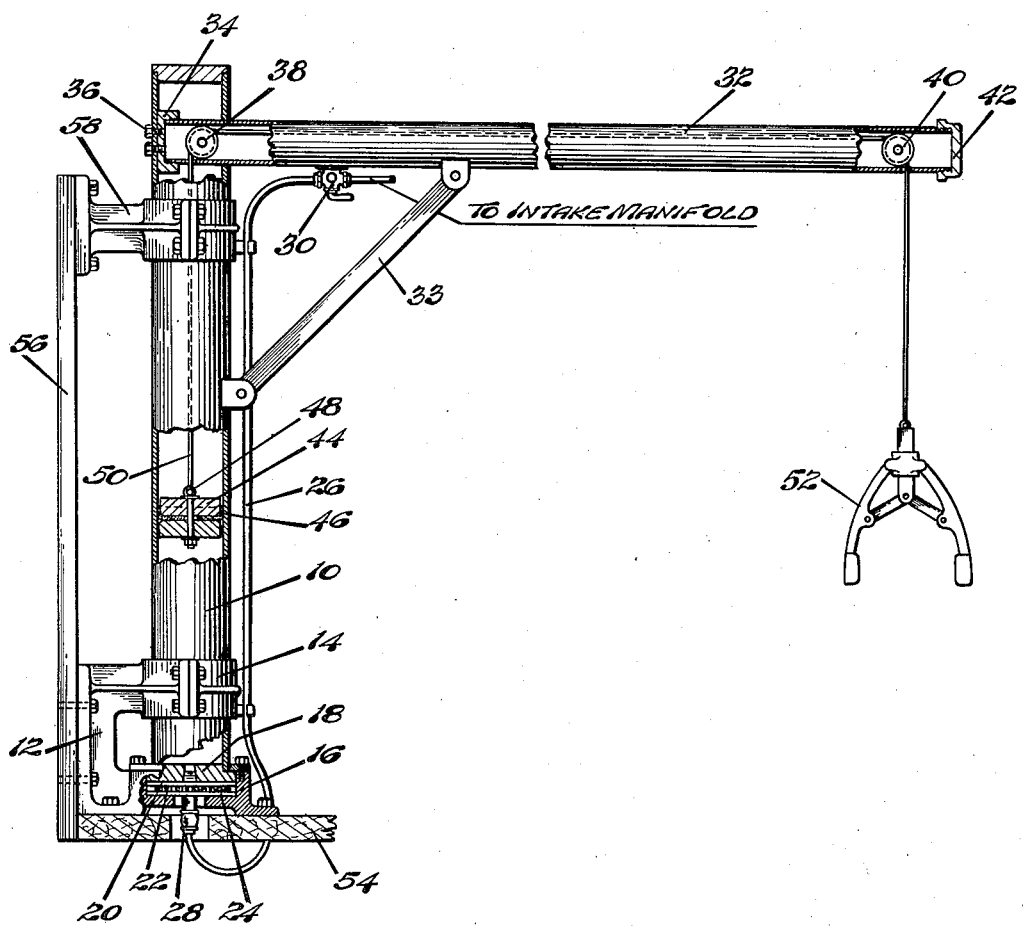

2,446,488

UNITED STATES PATENT OFFICE 2,446,488

HOISTING DEVICE

Cecil Eugene Pierce, West Southport, Maine

Application May 11, 1945, Serial No. 593,267

4 Claims. (Cl. 212—30)

This invention relates to load-hoisting devices and comprises an improved portable device suitable for mounting on a truck for use in loading and unloading barrels of potatoes, crates of farm produce, and similar articles.

Load handling devices hitherto designed for such purposes have been relatively complicated and expensive to build—quite beyond the means of the small farmer. The most important object of my invention is to provide a simple and inexpensive load-hoisting device capable of employment on a relatively small truck and adapted to be operated from a truck engine without requiring additional gearing or power transmission equipment.

An important feature of the invention resides in a unitary mast, boom and fluid pressure cylinder formed by joining together two metal pipes in such fashion as to serve the functions of these elements.

Another feature of the invention resides in the combination of a piston slidably mounted in the hollow mast and connected to a cable extending through the hollow boom, the piston being actuated by connecting the interior of the mast to the intake manifold of the truck engine, whereby air may be exhausted from the mast and the piston operated by the vacuum thus created.

These and other objects and features of my invention will be more readily understood and appreciated from the following detailed description of a preferred embodiment thereof, selected for purposes of illustration and shown in the accompanying drawings, in which:

Fig. 1 is a view in side elevation of a load-hoisting device constructed according to my invention, Fig. 2 is a plan view of the load-hoisting device and a portion of a truck upon which the device is mounted, and Fig. 3 is a view in end elevation of a truck and load-hoisting device.

As shown particularly in Fig. 1, the load-hoisting device of my invention, in its preferred form, includes an upright mast 10 formed of steel or wrought iron pipe. The mast 10 is supported adjacent its lower end in a C-shaped bracket 12 having an upper limb 14, embracing the mast 10, and a base portion 16. An apertured plug 18 seals the lower end of the mast 10 and has a flange extending into a chamber formed in the base 16. Secured to the bottom of the plug 18 is a metal disk or wear plate 20 which rests upon a race of ball bearings 22 held in a groove (not shown) formed in the upper surface of a metal disk 24, the whole forming a thrust bearing upon which the mast 10 is rotatably supported.

Extending into the bottom of the base 16 is a nozzle 26 having a swivel connection with the plug 18. The upper end of the nozzle 26 is secured to the plug 18 and extends into the aperture therein. The lower end of the nozzle is connected to a flexible conduit or tube 28 leading to the intake manifold of the truck engine and controlled by a three-way valve 30.

A horizontal boom 32 of steel or wrought iron pipe passes at its inboard end through a hole in the mast 10 and is threaded into a socket 34 which is curved to fit the inside wall of the mast 10 and is secured thereto by means of four bolts 36. An arm 33 is secured to the mast 10 and the boom 32 to serve as a supporting bracket and stiffen the boom.

Within the boom 32 and disposed at the inboard end thereof is a sheave 38. A similar sheave 40 is mounted within the boom at its outboard end. Holes are bored in the boom beneath the sheaves 38 and 40. A cap 42 seals the outer end of the boom 32. Within the mast 10 is a piston 44 formed by a plurality of disks clamped together by an eye bolt 48 and including a sealing gasket 46 interposed between an adjacent pair of piston disks. A cable 50 is secured at one end to the eyebolt 48 of the piston and is rove over the sheaves 38 and 40, passing upwardly in the axis of the mast and entering the boom 32 through the hole therein beneath the sheave 38. The free end of the cable 50 is secured to an articulated grapnel or clamp 52 adapted to grip a barrel or other object to be loaded aboard the truck.

The loading device may conveniently be mounted in a truck as shown generally in Fig. 3. The C-shaped support 12 may be bolted to the floor 54 of the truck and to an upright front wall 56. A second support 58 is bolted to the upright wall 56 and includes a clamp ring encompassing the mast 10 loosely in order to permit rotation thereof.

When it is desired to load an object on the truck, for example, a barrel of potatoes, the valve 30 is turned to vent the interior of the mast, the grapnel 52 is pulled down by hand and applied to the barrel. Then the valve 30 is turned to connect the interior of the mast 10 to the intake manifold of the truck engine. The vacuum thus created in the mast below the piston 44 draws the piston down, pulling the cable with it and lifting the barrel until it is high enough to be swung onto the truck. The mast and boom turn as a unit, thus swinging the barrel into a position over the truck floor. Thereupon the valve 30 is turned to vent the interior of the mast 10 and permit gravity to cause the load to draw the piston upward in the mast until the barrel comes to rest on the floor of the truck.

It is to be emphasized that the mast 10 serves not only as a load supporting member but also as a cylinder for the piston 44 which moves in direct engagement with the inner walls of the mast. This factor considerably simplifies the construction of the device, eliminates parts, and renders it possible to manufacture the load-hoisting apparatus most inexpensively. As herein shown, the controlling valve 30 is mounted upon the boom 32 adjacent to the mast where it is within convenient reach of a man working in the truck to swing the boom and place the barrels brought into the truck.

Various alterations may be made in the apparatus shown in the drawings without departing from the spirit of the invention defined in the appended claims. For example, the thrust bearing at the bottom of the mast may be simplified by merely sealing the bottom of the pipe with a plate apertured to receive the nozzle and resting on a simple bracket secured to the forward wall of the truck body.

Having now described and illustrated a preferred embodiment of my invention, what I claim as new and desire to secure by Letters Patent of the United States is:

1. A hoisting device for automotive trucks, comprising a vertical pipe serving both as a mast and a fluid-pressure cylinder and having an opening in its wall near its upper end, a socket secured to the inner wall of the vertical pipe opposite said opening, a horizontal pipe passing inwardly through said opening, having a hole communicating with the vertical pipe and being supported in said socket, a piston movable in direct contact with the walls of the vertical pipe, and a cable connected to the piston and leading therefrom longitudinally through the horizontal pipe.

2. A hoisting device for automotive trucks, comprising a vertical pipe serving both as a mast and a fluid-pressure cylinder, a pipe passing horizontally through the wall of the vertical pipe near the upper end of the latter and having an opening communicating therewith, a socket piece supporting the horizontal pipe within the vertical pipe, a piston movable within the vertical pipe, fluid pressure connections including a controlling valve carried by said horizontal pipe, and a tube extending from the vertical pipe to the intake manifold of the truck engine, and a cable passing from said piston upwardly in the vertical pipe and then longitudinally through the said horizontal pipe.

3. A hoisting device for automotive trucks, comprising a vertical pipe serving both as a mast and as a fluid-pressure cylinder, a horizontal pipe rigidly secured to and opening through a passage into the upper end of the vertical pipe, a piston movable vertically in direct engagement with the inner wall of the vertical pipe, a cable connected to the upper end of said piston, passing upwardly in the axis of said vertical pipe, entering the horizontal pipe and passing longitudinally outwardly through it, and connections between the lower end of said vertical pipe and the intake manifold of the truck engine.

4. A portable hoisting device for automotive trucks, comprising a vertically mounted rotatable pipe serving both as a mast and a fluid-pressure cylinder, a horizontal pipe secured to the upper end of the said vertical pipe and opening into it, a sheave mounted to rotate within the inner end of the horizontal pipe and within the upper end of the vertical pipe, the horizontal pipe having an opening beneath the sheave in line with the axis of the vertical pipe, a piston movable in the vertical pipe, and a cable passing upwardly from the piston in the axis of the vertical pipe, entering the horizontal pipe through the opening therein and passing about the sheave, a second sheave located in and adjacent to the outer end of the horizontal pipe over which the said cable also passes, and connections between the lower end of said vertical pipe and the intake manifold of the truck engine.

CECIL EUGENE PIERCE.

REFERENCES CITED

The following references are of record in the file of this patent:

UNITED STATES PATENTS

| Number | Name | Date |
| --- | --- | --- |
| 655,321 | Anderson | Aug. 7, 1900 |
| 677,874 | Macbeth | July 9, 1901 |
| 810,218 | North | Jan. 16, 1906 |
| 925,968 | Webb | June 22, 1909 |
| 1,101,190 | Kearney | June 23, 1914 |